United States Patent

Campbell, Jr. et al.

[11] Patent Number: 5,378,086
[45] Date of Patent: Jan. 3, 1995

[54] SYSTEMS TO EXTERMINATE AND CONTROL SUBTERRANEAN TERMITES AND OTHER SUBTERRANEAN PESTS

[76] Inventors: Albert E. Campbell, Jr., 19326 Firestone Cir., Huntington Beach, 92648; Charles F. Stevenson, 29500 Heathercliff, No. 195, Malibu, both of Calif. 90265

[21] Appl. No.: 122,613

[22] Filed: Sep. 15, 1993

[51] Int. Cl.$^6$ .................. A01M 1/20; E02B 11/00
[52] U.S. Cl. ...................... 405/229; 43/124; 43/130; 405/131; 52/101
[58] Field of Search .......... 405/229, 131; 52/101; 47/1 F, 1.42; 43/124, 130, 125, 132.1

[56] References Cited

U.S. PATENT DOCUMENTS

| | | | |
|---|---|---|---|
| 1,247,166 | 11/1917 | Steelquist | 405/131 |
| 1,727,995 | 9/1929 | Lechler . | |
| 2,117,419 | 5/1938 | Hamrick et al. | 43/130 X |
| 2,168,099 | 8/1939 | Hawkins et al. | 111/7 |
| 2,350,721 | 6/1944 | Brown | 47/1 F |
| 2,448,265 | 8/1948 | Kagy et al. | 111/200 X |
| 2,625,123 | 1/1953 | Morgan | 47/1.42 X |
| 2,842,892 | 7/1958 | Aldridge et al. | 52/101 X |
| 3,791,443 | 2/1974 | Burt et al. | 405/131 X |
| 4,297,055 | 10/1981 | Peacock | 405/184 |
| 4,637,161 | 1/1987 | Turner | 43/130 |
| 5,109,629 | 5/1992 | King et al. | 43/124 |

Primary Examiner—Dennis L. Taylor
Attorney, Agent, or Firm—W. Edward Johansen

[57] ABSTRACT

A system to exterminate and control subterranean termites and other subterranean pests inhabiting a subterranean area surrounding or in close proximity to a structure having a perimeter near ground level and support pads includes a plurality of first pipes, a plurality of second pipes, a source of steam, a plurality of temperature sensors, a temperature display and a controller. Each pipe has a plurality of holes in its sidewall. The first and second pipes are disposed beneath ground level along the perimeter of the structure and along its support pads, respectively. The source of steam is fluidly coupled to the pipes. Each temperature sensor is disposed adjacent to one of the pipes. The temperature sensors generate temperature signals. The temperature display displays a temperature reading of the temperature adjacent to each pipe in response to the temperature signals. The controller regulates pressure and/or temperature of the source of steam in response to the temperature signals.

4 Claims, 3 Drawing Sheets

SYSTEMS TO EXTERMINATE AND CONTROL SUBTERRANEAN TERMITES AND OTHER SUBTERRANEAN PESTS

BACKGROUND OF THE INVENTION

The field of the invention is systems to exterminate and control subterranean termites and other subterranean pests.

Subterranean termites are pests which enter either a commercial structure or a residential structure from the surrounding and underlying soil, from cracks in the concrete foundation, underground water and gas pipes or through interconnecting tubules which termites themselves have constructed. The subterranean termites inhabit the subterranean area surrounding or in close proximity to either a commercial structure or a residential structure. In the case of slab construction the subterranean termites enter the building through cracks in the concrete slab or along plumbing lines which are fixed in the concrete slab.

Environmental concerns about toxic chemicals and the applications of pesticides in the termite and pest control industry have steadily increased during the past thirty years. Toxic chemicals which were once considered safe including DDT, malathion and chlorinated-based compounds are now either outlawed or greatly restricted in use by regulatory agencies. Chlordane, a known deadly toxin, was approved for soil applicatoin against subterranean termites by licensed operators until 1986. At that time the State of California determined the risk was unacceptably high for the continued use of chlordane both to the general public and the pest control opeators themselves. In 1989 the EPA outlawed the manufacture and/or use of chlordane.

Two deadly gases, methyl bromide and vikane, have been the mainstay of fumigation treatment for the eradication of drywood termites and other wood infesting insects in residential and commercial structure for the past forty years. However, issues of human health, damage to ozone layer and the unknown long term effects associated with these compounds have provided the impetus for new studies.

At present, various types of foams which are laced with termiticidic chemicals are being injected through the floors of slab-type structures as a means of combating subterrranean termites. There is much art to this technique since the density and viscosity of the foam is the key factor to its successful application and the hoped for penetration into the network of ground tunnels and nests beneath the slab itself. While the word "termicide" is non-specific, it generally implies a residual effect poisonous chemical in order to provide lasting treatment. This is exactly the property that is so dangerous to humans, pets and other domesticated animals, the water table, the soil and the environment at large.

A great deal of research is concurrently being focused on "safe" or naturally occurring chemicals for potential use in the termite/pest control industry. More significantly, alternate means of eradication and control are now being actively sought that require absolutely no application of chemicals.

The class Insecta has a low tolerance for temperature extremes. Entomologists have bracketed their survival zone between 60° F. and 90° F. Outside this range of temperatures, insects either relocate to a more favorable environment or die. Various species of rodents in the northern hemisphere, because of the abundance of fur or hair on their bodies are insulated from cold temperatures, but are unable to cope with heat. Instead they adopt defensive measures such as migrating to higher elevations or becoming nocturnal. Of all the alternative methods of insect/pest eradication, exposure to temperature extremes for even short duration of time appears to be the most effective.

It is known that a majority of insect life forms are unable to resist temperatures of 120° F. for even 10 or 15 minutes. Encased in a body structure that is deprived of the benefit of evaporative cooling from perspiration, insects and rodents will dehydrate readily at 140° F. and cease the necessary life functions of metabolism and digestion. Moreover, molecular biologists report that DNA, the more basic building block of all life forms, begins to either denature or unravel at 165° F.

Different types of thermal application have been patented for treatment of infested structures by drywood termites, *Incisitermes Minor*. U.S. Pat. No. 4,961,283 teaches a method to exterminate insects in urban dwellings utilizing heat to kill the insects. The application of heat is not optimized.

U.S. Pat. No. 5,184,419 claims an advantage for the more localized use of heating elements, radiant lamps and the microwave transmitter. This is for the interior of structures.

A more detail review of the alternate methods reveals that the principal focus has been the treatment of insect-infested structures. Only in selected disclosures has the extermination of insects or pests that inhabit the soil been addressed. Yet this is a pressing problem of considerable economic importance. The damage which subterranean termites alone create can be estimated at $500 millions annually.

The issue now becomes one of how to best generate and apply heat efficiently to the underground living quarters of this army of multitudinous insects and pests in order to achieve the requisite temperature and time at that temperature sufficient for extermination. Moreover, this application must be performed more than one, since this army has a vast underground network of interconnecting tunnels and nests providing the means for escape and/or return. There are also vast reserves in this army occupying remote and unknown locations that have the ability to travel great distances and multiply in transit arriving at the battle ground a year later ready to resume warfare.

The problem of attempting to impress extraeme temperature (high or low) in the soil which insects or rodents inhabit is that the earth itself offers a built-in resistence to temperature change. The very mass of the ground acts as a huge sponge for energy being transferred to to it and will quickly dissipate this energy with little or no resultant change in temperature. Steam is the one notable exception.

Steam, and particularly superheated steam, carries enormous amounts of energy in the form of the latent heat of vaporization and has been used in the underground application of rejuvenating oil fields. Geologists and petroleum engineers claim that production of oil from older wells is impaired by the long term formation of higher hydrocarbons, such as wax, in the oil bearing sands and sedimentary rock formations several hundred feet beneath the ground surface. Steam and/or superheated steam which is injected into the well tubing at ground surface travels to the bottom of the well. There it passes through the perforated well casing and melts these waxy compounds thus freeing the flow of oil again from these underground formations allowing it to be pumped to surface. Steam is clean. Steam does not require the use of chemicals. Steam is fast. Steam is economical to produce. An entire industry is centered around the manufacture of boilers and associated equipment for the generation, control, transfer and safe application of steam and superheated steam.

U.S. Pat. No. 4,637,161 teaches a portable apparatus which has a tubular ground probe for penetrating downward into an underground habitat of insects or animals. The upper end of the probe has an inlet for steam under pressure. A downwardly opening shield on the lower portion of the probe is slidable therealong. The shield includes a side vent for venting steams erupting from the ground within the confines of the shield downwardly and outwardly from peripheral portion of the shield. The portable apparatus injects steam into the entrance of fire ant nests and other insects. There are two shortfalls in the practical application this treatment in that it presumes the a priori knowledge of where the underground nests are located. For fire ants, this is fairly certain since the entrance is readily identifiable as a mound of excavated soil. However, for a category of rodents, such as field mice, moles, golphers, Norwegian rats, groundhogs and squirrels, the labyrinth of tunnels, escape routes, nests and living quarters are exceptionally complex with hard-to-find entrances. Subterranean termites also fall into this category with the added complication that their fortresses are almost always near or partially beneath the foundation of residential and commercial structures. Without the exact knowledge of where the entrance to the underground habitats of such insects and/or pests are located the portable apparatus with tubular ground probe is not effective. The other problem with this apparatus is that the treatment is concluded when the tubular ground probe is removed. In order to continue treatment at a later point in time the portable apparatus would have to be returned and the tubular ground probe reinserted.

U.S. Pat. No. 4,742,641 teaches for achieving effective control of pests, such as insects and rodents, in residential and commercial buildings, a permanently installed pest control system which is particularly adapted for incorporation into existing structures without substantial modification. The system includes an exterminating liquid supply subsystem and an exterminating liquid distribution subsystem. The supply subsystem includes a replaceable exterminating liquid reservoir, an electrically driven pump and switch means (which may include a time clock and a short term timer) coupled to a source of electrical energy to selectively energize the pump. The distribution subsystem includes a trunk tube connected to the pump to receive pressurized exterminating liquid drawn from the reservoir and one or more branch tubes extending throughout the building at a position near the floor, each branch tube having a plurality of outwardly directed small apertures piercing its wall at intervals along its length to effect nozzles through which pressurized exterminating liquid is dispensed into the inter-wall space and/or onto the area at which the wall and floor meet. Optionally, a pressure sensor may be placed on the output side of the pump to provide an indication of an empty reservoir or a substantial blockage in the distribution system.

U.S. Pat. No. 4,625,474 teaches a termite control system which is for use with underground or ground contacting foundation and which has a plurality of pipe sections. The termite protection system delivers a liquid insecticide throughout the wooden foundation structure. The termite control system is disposed either at or below ground level.

U.S. Pat. No. 3,909,975 teaches a method for soil treatment which uses a network of interconnected rigid or collapsible perforated pipes to deliver a liquid insecticide. The pipes are installed below ground.

U.S. Pat. No. 3,540,837 teaches a multiple injection and grouting rod assembly which include a hollow, horizontal manifold and a plurality of vertically depending tines having holes near their ends for passage of a toxic liquid. The multiple injection and grouting rod assembly inserts toxic liquids into a surface below the ground in order to control termites.

U.S. Pat. No. 3,774,556 teaches an apparatus which introduces toxic liquids into soil in order to exterminate subterranean termites.

U.S. Pat. No. 4,858,375 teaches a termite control apparatus which introduces termiticide along the walls of a structure.

U.S. Pat. No. 5,184,418 teaches a termite protection system for a wooden foundation structure which has a plurality of pipe sections. The termite protection system delivers a liquid pesticide throughout the wooden foundation structure. The termite protection system is disposed above ground level and is coupled to the wooden foundation structure.

U.S. Pat. No. 3,624,953 teaches a termite control system which introduces insecticide through a pipe vertically disposed within a hole adjacent to a dwelling.

U.S. Pat. No. 3,602,248 teaches a termite control system for which introduces insecticide through a network of pipes which are laid according to the floorplan of a structure. The pipes are disposed below the foundation slab of the structure.

SUMMARY OF INVENTION

The present invention is directed to a system to exterminate and control subterranean termites and other subterranean pests inhabiting a subterranean area surrounding or in close proximity to a structure. The system includes a plurality of pipes and a source of steam which is fluidly coupled to the pipes. Each pipe has a plurality of holes in its sidewall.

In a first separate aspect of the invention the pipes are disposed beneath ground level along a perimeter of the structure.

In a second separate aspect of the invention the system also includes a plurality of temperature sensors and a temperature display. One of the temperature sensors is disposed adjacent to each pipe and generates a temperature signal related to the temperature adjacent to that pipe. The temperature display is electrically coupled to the temperature sensors and displays a temperature reading adjacent to each pipe in response to the temperature signal.

In a third separate aspect of the invention the sysem also includes a plurality of temperature sensors and a controller. One of the temperature sensors is disposed adjacent to each pipe and generates a temperature signal related to the temperature adjacent to that pipe. The controller is electrically coupled to the temperature sensor and regulates pressure and/or temperature of the source of steam in response to the temperature signal.

In a fourth separate aspect of the invention the steam is superheated.

In a fifth separate aspect of the invention the source of steam is a portable boiler or a steam generator.

In a sixth separate aspect of the invention the pipes are disposed beneath a concrete slab at ground level on which a structure rests.

Other aspects and many of the attendant advantages will be more readily appreciated as the same becomes better understood by reference to the following detailed description and considered in connection with the accompanying drawing in which like reference symbols designate like parts throughout the figures.

The features of the present invention which are believed to be novel are set forth with particularity in the appended claims.

DESCRIPTION OF THE PREFERRED EMBODIMENT

The main thrust of all of the above patents, articles in pest control trade journals and entomological research into alternative methods has been directed toward residendial structures and commercial buildings. Scant attention has been devoted to alternative methods for exterminating and controlling soil-inhabiting subterranean termites and other subterranean pests including miscellaneous soil-dwelling insects such as slugs, beetles and ants, and a variety of damage causing rodents such as moles, gophers and field mice. This disclosure is aimed at exterminating soil originating and/or soil inhabiting pests. This is an alternative method for the extermination of insects/rodents without the use of chemicals. This method advocates the injection of either steam or superheated steam into the underground habitat of insects, pests and rodents in order to raise their body temperature to a minimum of 125° F., preferably higher, for a period of time on the order of 10 to 20 minutes in order to terminate their life function. No chemicals are used.

Figure 1:
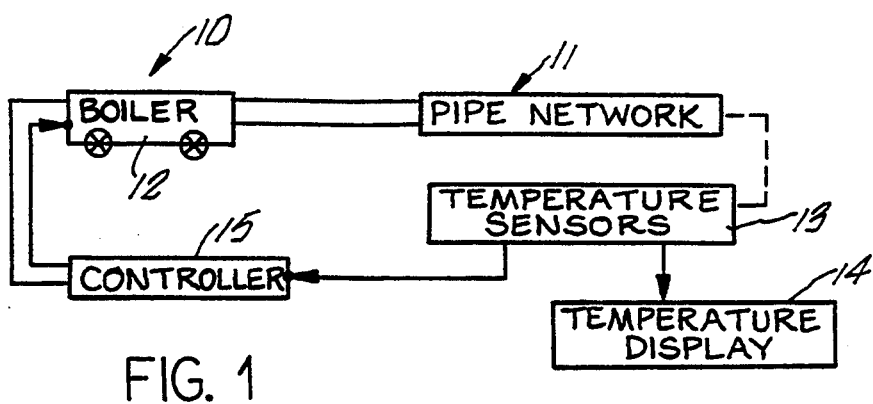
FIG. 1 is a schematic diagram of system to exterminate and control subterranean termites and other subterranean pests inhabiting a subterranean area surrounding or in close proximity to a structure having a perimeter near ground level includes a pipe network and temperature sensors according to the first embodiment of the present invention.
Figure 2:
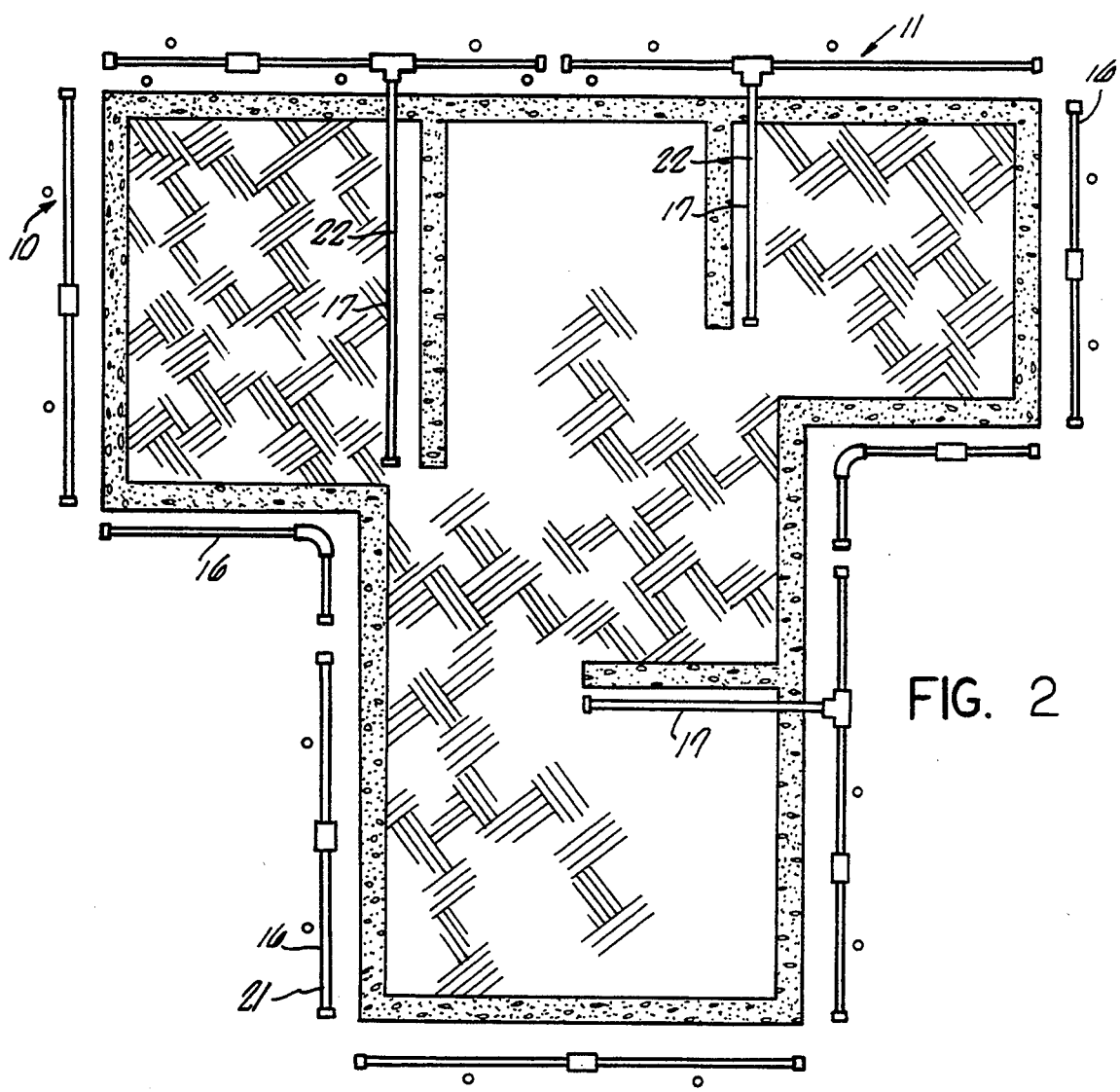
FIG. 2 is a top plan view of the pipe network and the temperature sensors of the system of FIG. 1 which includes a plurality of pipes with perforations, a plurality of riser connections, a plurality of caps and a plurality of T-sections.
Figure 3:
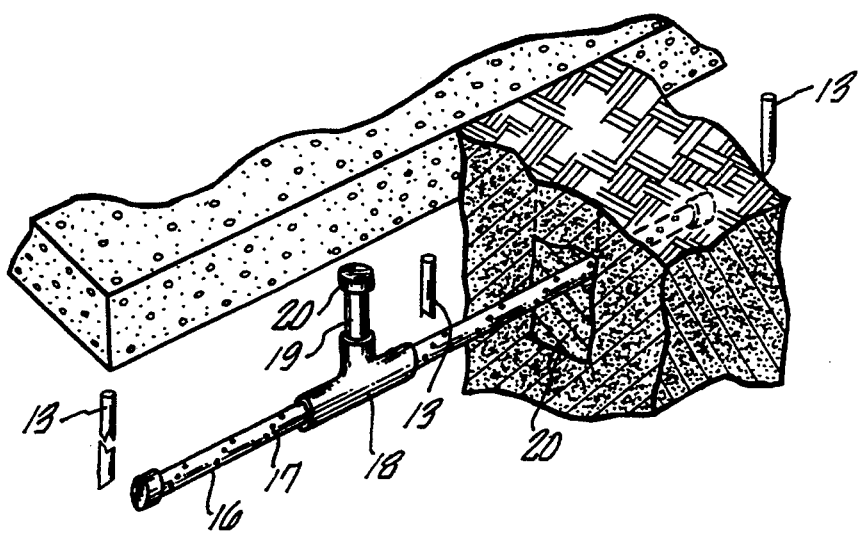
FIG. 3 is a partial perspective view of the pipe network and the temperature sensors of the system of FIG. 1.

Referring to FIG. 1 in conjunction with FIG. 2 and FIG. 3 a piping system 10 includes a pipe network 11, a source 12 of steam, a plurality of temperature sensors 13, a temperature display 14 and a controller 15. The source 12 of steam may be either a portable boiler or a steam generator. The steam may be superheated. The pipe network 11 includes a plurality of first pipes 16, a plurality of second pipes 17, a plurality of T-sections 18, a plurality of riser connections 19 and a plurality of caps 20. Each first pipe 16 has a plurality of perforations 21 in its sidewall. Each second pipe 17 has a plurality of perforations 22 in its sidewall. Each T-section 18 fluidly couples either a first pipe 16 or a second pipe 17 to one of the riser connections 19. One of the riser connections 19 fluidly couples the source 12 of steam to each of either the first pipes 16 or the second pipes 17. Each temperature sensor 13 is disposed adjacent to one of the first pipes 16. The temperature sensors 13 generate temperature signals. The temperature display 14 is electrically coupled to the temperature sensors 13 and displays the temperature reading adjacent to each first pipe 16 in response to the temperature signals. The controller 15 is electrically coupled to the temperature sensors 13 for regulating pressure and/or temperature of the source 12 of steam in response to the temperature signals. The piping system 10 is used to exterminate and control subterranean termites and other subterranean pests inhabiting a subterranean area surrounding, underneath or in close proximity to the structure having a perimeter near ground level.

Referring to FIG. 2 in conjunction with FIG. 1 and FIG. 3 the first pipes 16 are disposed beneath ground level along the perimeter of a structure. The second pipes 17 are disposed beneath ground level along the support pads of a structure. The support pads are underneath the structure. The piping system 10 is permanently installed and applies either steam or superheated steam to the entire foundation of either a commercial building or a residential structure. The first and second pipes 16 and 17 of the pipe network 11 are sections each of which has a length of approximately twenty feet. This length allows for subsequent introduction of either steam or superheated steam. The injection of either steam or superheated steam from the perforations 21 and 22 in the first and second pipes 16 and 17, respectively, creates an underground temperature zone of at least 125° F. The underground temperature zone reaches below the underground level of the foundation footing and foundation support pads is maintained for at least twenty minutes thereby insuring a "life free" zone around and beneath the entire structure. In the case of foundation and wooden floor construction, there is an advantage in installing multiple segments of the first and second pipes 16 and 17 before the footings, foundations and support pads are poured.

The pipe network 11 also includes thermal insulation 23 which is coupled to the T-sections 18 and the riser connections 19. The use of thermal insulation 23 on pipes 16 and 17 promotes greater thermal efficiency and transfers more heat to each segment of the first and second pipes 16 and 17. The piping system 10 is segmented in order to match the rating of portable boilers or steam generators in pounds per hour. Pest control officers are constrained by the size of residential entry gates, by the terracing or grade of ground surface and by the cramped access afforded by bushes, trees, planter boxes and swimming pools. Therefore the boiler size is predetermined by these considerations as well as the requirement for mobility around the perimeter of the structure. The perforation size and placement on the steam piping as well as the individual segment length are selected to be matched to the capacity of the portable boiler. There is also the consideration of soil composition, clay versus sand versus humus versus fine rock versus a mixture of all of these. Steam has different permeation rates in these various compositions and hence will require different time periods of treatment in order to effect the required temperatures. Moreover, these different compositions have different heat capacities and moisture contents which will add to the time variable for treatment.

The spiral placement of perforations 21 and 22 along the sidewall surface of the first and second pipes 16 and 17 promotes a greater symmetry of ejected steam along the piping axis and thereby a more uniform temperature zone in the underground soil. It also maintains the wall strength of each of the first and second pipes 16 and 17.

Figure 4:
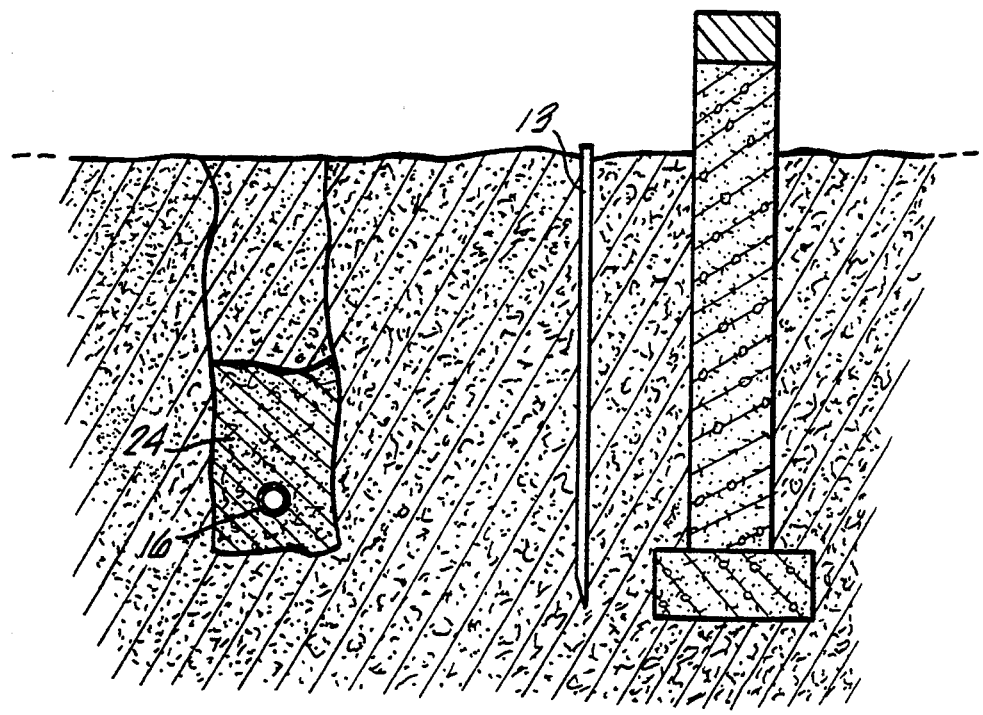
FIG. 4 is a side elevational view of the pipe network and the temperature sensors of the system of FIG. 1.
Figure 5:
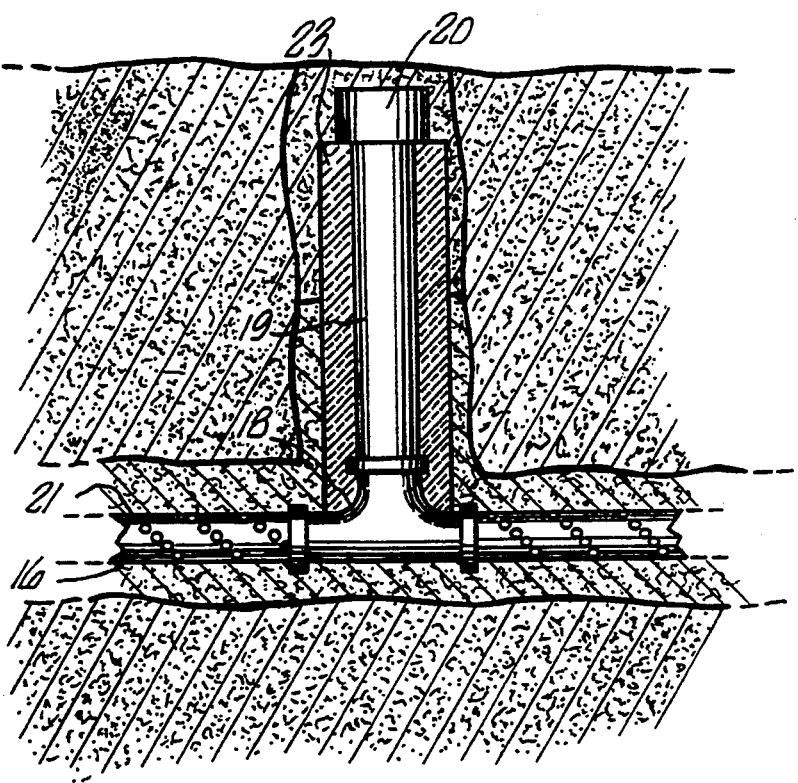
FIG. 5 is a front elevational view in cross-section of the pipe network of the system of FIG. 1 which includes a riser connection, a T-section and a section of pipe with perforations.

Referring to FIG. 3 in conjunction with FIG. 4 and FIG. 5 The placement of pea gravel 24 surrounding the buried pipe network 11 shields the perforations 21 and 22 from mud, dead insects or rodent bodies and the roots of plant, bushes or trees. Although rust may be a problem, the steam, if superheated, is dry and used on an infrequent basis. Buried pipes in the oil fields of Central California are still in in use today after 25 years of frequent steaming operation and rust is not a problem.

Since underground pests are capable of mobility and have constructed elaborate tunnels, living spaces, escape routes and transport networks, the lethal medium must be instantaneous and pervasive. Either steam or superheated steam satisfies both of these requirements.

Underground insects and rodents are both persistent and determined. A temporary setback of losing a colony, family or an entire local populace is, in itself, not sufficient to deter future underground encroachments or attacks at a later time. The strategy of coping with this threat is to defend the structure since its position is fixed rather than chase the pests which are mobile. The medieval setting offers a valid comparison in that the castle was a fixed installation surrounded by a moat as a means for preventing the entry of marauders and outlaws. The moat is analgous to the steam piping. Moveover the permanency of the piping system 10 and its fixed position with respect to the given structure to be protected invites the additional concept of either periodic treatment or control maintenance. Once the piping system 10 is installed it may be used on a repeated basis to attach a source of steam to one of the riser connections 18 and ejects either steam or superheated steam for the purpose of the continued protection of the structures from underground pest attack.

Oil field steam injection systems have been used for more than 25 years. Some oil field steam injection systems are used weekly and have proven to be effective over this duration of time for delivering adequate heat to underground formations. Temperatures in excess of 140° F. are achieved at a distance of several feet from where the steam is ejected through perforations in a permanent well casing.

The temperature sensors 13 provide a measurement of the underground temperature thereby determining when a temperature lethal to the underground insects and rodents has been achieved. The temperature measurement may be conveniently be displayed on the temperature display 14 which may be a large numeral, digital read-out meter and which keeps the operator of the source 12 of steam alerted to the need for the proper temperature for the required time. Because pest control operators are frequently required to maintain written records of treatment specifics in order to demonstrate compliance with local and/or state laws, the outputs of the temperature sensors 13 can be simultaneously printed on a chart strip recorder, an instrument which will plot temperature as a continuous function of time. This is important to a pest control operator for demonstrating that a zone of lethal heat to underground insects and/or rodents has been achieved for a required period of time around the perimeter of a customer's structure.

This output signal of each temperature sensor 13 is not only used to simultaneously display temperature measurement and provide a temperature-time history of treatment, but it also provides a feedback signal to automatically control the source 12 of steam. This can be accomplished in different ways, for example the heat source that generates the steam can be controlled by automatically regulating either the flow of fuel to the burners or the electrical current to the heaters. The feedback signal can be used to operate a solenoid-controlled throttle valve which regulates the pressure of steam injected into the piping system. Finally the quality or temperature of the superheated steam may be controlled by using the feedback signal to autmatically regulate the heat input to the steam chest.

Figure 6:
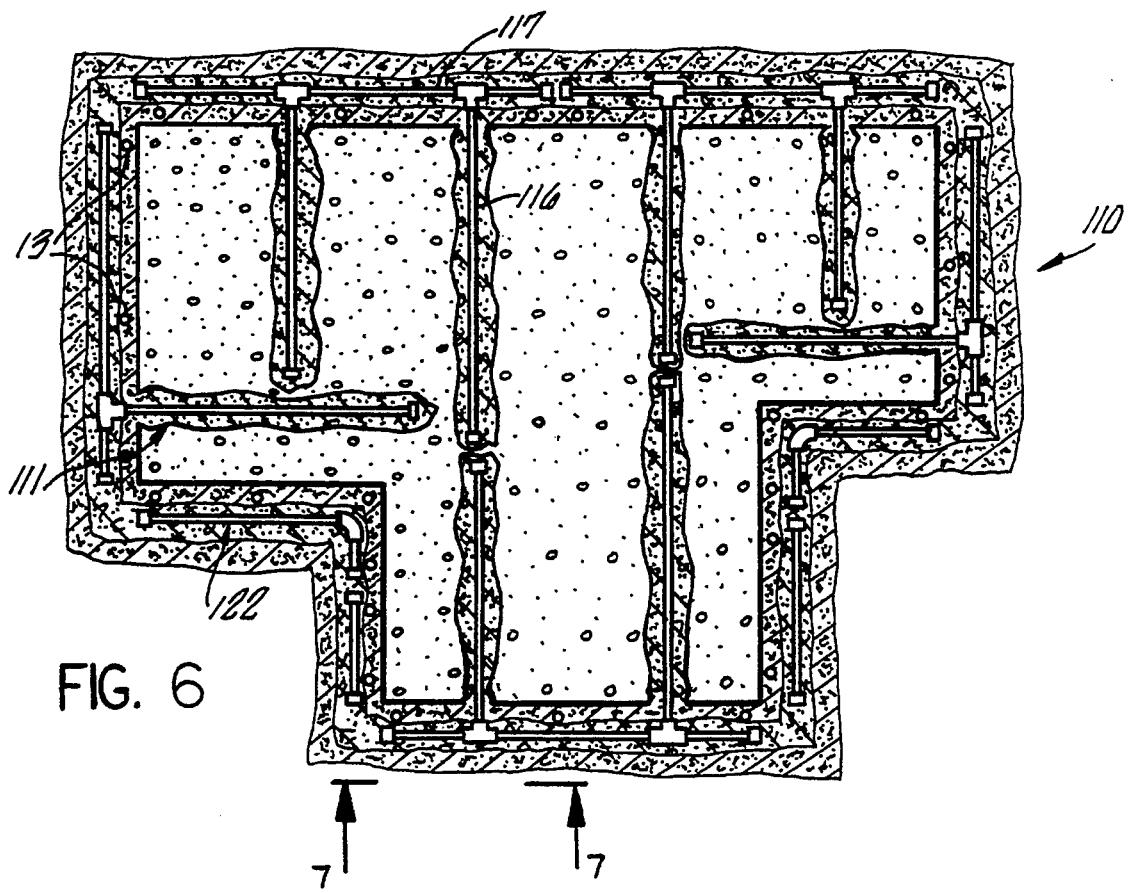
FIG. 6 is a top plan view of a pipe network and temperature sensors of a system to exterminate and control subterranean termites and other subterranean pests inhabiting a subterranean area surrounding or in close proximity to a structure on a slab of concrete having a perimeter near ground level includes a pipe network and thermocouples according to the second embodiment of the present invention.
Figure 7:
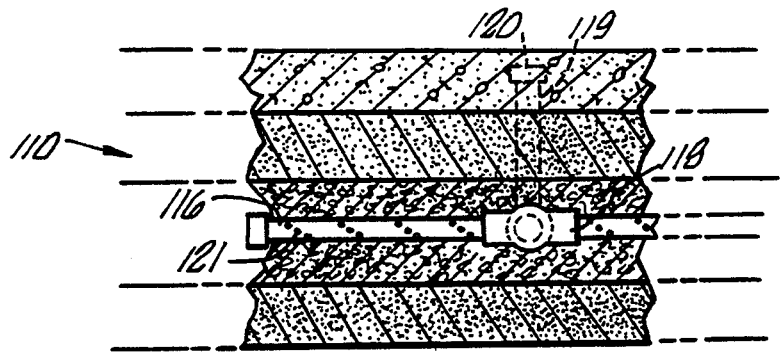
FIG. 7 is a front elevational view in cross-section of the pipe network of the system of FIG. 6 taken along the line 7—7 of FIG. 6.

Referring to FIG. 6 in conjunction with FIG. 7 a piping system 110 includes a pipe network 111, a source 12 of steam, a plurality of temperature sensors 13, a temperature display 14 and a controller 15. The pipe network 111 includes a plurality of first pipes 116, a plurality of second pipes 117, a plurality T-sections 118, a plurality of riser connections 119 and a plurality of caps 120. Each first pipe 116 has a plurality of perforations 121 in its sidewall. Each second pipe 117 has a plurality of perforations 122 in its sidewall. The first pipes 116 are disposed under a slab of concrete and beneath ground level. The second pipes 117 are disposed beneath ground level along the perimeter of a structure. Each T-section 118 fluidly couples either a first pipe 116 or a second pipe 117 to one of the riser connections 119. One of the riser connections 119 fluidly couples the source 12 of steam to each of either the first pipes 116 or the second pipes 117. Each temperature sensor 13 is disposed adjacent to one of the second pipes 117. The temperature sensors 13 generate temperature signals. The temperature display 14 is electrically coupled to the temperature sensors 13 and displays the temperature reading adjacent to each second pipe 117 in response to the temperature signals. The controller 15 is electrically coupled to the temperature sensors 13 for regulating pressure and/or temperature of the source 12 of steam in response to the temperature signals. The piping system 110 is used to exterminate and control subterranean termites and other subterranean pests inhabiting a subterranean area surrounding, underneath or in close proximity to a structure which utilizes a slab of concrete which is near ground level.

This method to exterminate soil inhabiting insects and rodents is adaptable to existing structures as well as those being readied for construction. In fact the preconstruction of architectual and engineering planning offers an ideal time in which the steam plumbing placement, trenching diagrams and other important details can be coordinated with the prime contractor. This is particularly true for concrete slab floors, in that there is an opportunity to install multiple segments of steam piping under the slab as well as around the perimeter before the concrete is poured.

U.S. Pat. No. 4,297,055 teaches a process of installing a pipe system under an existing building constructed upon a concrete slab or other foundation not permitting access beneath the ground floor, for the purpose of periodic introduction of insecticide to control or eradicate subterranean termites or other subterranean pests. The process includes the steps of forming a substantially horizontal hole or accessway beneath the building slab or foundation and inserting a pipe through the formed hole. The pipe is made of a plastic or flexible material containing apertures for discharging the insecticide. The pipe is inserted in the hole or accessway by capping one end of the pipe. The process also includes the step of inserting a solid push rod into the pipe until the push rod contacts the capped end. The pipe can be then pushed through the hole or accessway without lateral or vertical displacement.

From the foregoing it can be seen that a piping system which is used to exterminate and control subterranean termites and other subterranean pests inhabiting a subterranean area surrounding or in close proximity to a structure has been described. It should be noted that the sketches are not drawn to scale and that distance of and between the figures are not to be considered significant. Accordingly it is intended that the foregoing disclosure and showing made in the drawing shall be considered only as an illustration of the principle of the present invention.

What is claimed is:

1. A system to exterminate and control subterranean termites and other subterranean pests inhabiting a subterranean area surrounding or in close proximity to a structure having a perimeter near ground level, said system comprising:
   a. a plurality of first pipes each of which has a plurality of holes in its sidewall, said first pipes being disposed beneath ground level along the perimeter of the structure;
   b. a source of steam fluidly coupled to said first pipes;
   c. a plurality of temperature sensors each of which is disposed adjacent to one of said first pipes whereby said temperature sensors generate temperature signals; and
   d. a temperature display electrically coupled to said temperature sensors and displays a temperature reading adjacent to each of said first pipe in response to said temperature signals.

2. A system to exterminate and control subterranean termites and other subterranean pests inhabiting a subterranean area surrounding or in close proximity to a structure having a perimeter near ground level, said system comprising:
   a. a plurality of first pipes each of which has a plurality of holes in its sidewall, said first pipes being disposed beneath ground level along the perimeter of the structure;
   b. a source of steam fluidly coupled to said first pipes;
   c. a plurality of temperature sensors each of which is disposed adjacent to one of said first pipes whereby said temperature sensors generate a temperature signals; and
   d. a controller electrically coupled to said temperature sensors for regulating pressure and/or temperature of said source of steam in response to said temperature signals.

3. A system to exterminate and control subterranean termites and other subterranean pests inhabiting a subterranean area surrounding or in close proximity to a structure which is mounted on a concrete slab at ground level, said system comprising:
   a. a plurality of first pipes each of which has a plurality of holes in its sidewall, said first pipes being disposed beneath the concrete slab;
   b. a source of steam fluidly coupled to said first pipes;
   c. a plurality of second pipes each of which has a plurality of holes in its sidewall, said second pipes being disposed beneath ground level along the perimeter of the structure;
   d. a plurality of temperature sensors each of which is disposed adjacent to one of said second pipes whereby said temperature sensors generate temperature signals; and
   e. a temperature display electrically coupled to said temperature sensors in response to said temperature signals.

4. A system to exterminate and control subterranean termites and other subterranean pests inhabiting a subterranean area surrounding or in close proximity to a structure which is mounted on a concrete slab at ground level, said system comprising:
   a. a plurality of first pipes each of which has a plurality of holes in its sidewall, said first pipes being disposed beneath the concrete slab;
   b. a source of steam fluidly coupled to said first pipes;
   c. a plurality of second pipes each of which has a plurality of holes in its sidewall, said second pipes being disposed beneath ground level along the perimeter of the structure;
   d. a plurality of temperature sensors each of which is disposed adjacent to one of said second pipes whereby said temperature sensors generate temperature signals; and
   e. a controller electrically coupled to said temperature sensors for regulating pressure and/or temperature of said source of steam in response to said temperature signals.

* * * * *